(12) United States Patent
Kaieda et al.

(10) Patent No.: US 11,239,473 B2
(45) Date of Patent: Feb. 1, 2022

(54) CATALYST FOR SOLID POLYMER FUEL CELLS AND METHOD FOR MANUFACTURING THE SAME

(71) Applicant: TANAKA KIKINZOKU KOGYO K.K., Tokyo (JP)

(72) Inventors: Takeshi Kaieda, Hiratsuka (JP); Koichi Matsutani, Hiratsuka (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 0 days.

(21) Appl. No.: 16/606,180

(22) PCT Filed: Apr. 16, 2018

(86) PCT No.: PCT/JP2018/015646
§ 371 (c)(1),
(2) Date: Oct. 17, 2019

(87) PCT Pub. No.: WO2018/194009
PCT Pub. Date: Oct. 25, 2018

(65) Prior Publication Data
US 2020/0052309 A1 Feb. 13, 2020

(30) Foreign Application Priority Data

Apr. 19, 2017 (JP) .............................. JP2017-082639

(51) Int. Cl.
*H01M 4/92* (2006.01)
*H01M 4/86* (2006.01)
(Continued)

(52) U.S. Cl.
CPC ......... *H01M 4/921* (2013.01); *H01M 4/8657* (2013.01); *H01M 4/926* (2013.01);
(Continued)

(58) Field of Classification Search
CPC ... B01J 21/18; B01J 23/40; B01J 23/42; B01J 35/0033; B01J 35/006; C01P 2004/62;
(Continued)

(56) References Cited

U.S. PATENT DOCUMENTS 5,068,161 A * 11/1991 Keck .................. B01J 23/89
429/500
2003/0017378 A1 * 1/2003 Ruth ..................... H01M 4/921
502/182

(Continued)

FOREIGN PATENT DOCUMENTS

| EP | 2 351 614 A1 | 8/2011 |
| JP | H08-84930 A | 4/1996 |

(Continued)

OTHER PUBLICATIONS

"Materials for polymer electrolyte fuel cells," ISBN 978-4-526-07320-5, dated Nov. 27, 2014, FCDIC Fuel Cell Development Information Center.

(Continued)

*Primary Examiner* — Patricia L. Hailey
(74) *Attorney, Agent, or Firm* — Foley & Lardner LLP

(57) ABSTRACT

The present invention relates to a catalyst for solid polymer fuel cells in which catalyst particles including platinum or platinum alloy are supported on a carbon powder carrier. The catalyst of the present invention is a catalyst for solid polymer fuel cells in which the bond energy (Ec) at a gravity center position is 2.90 eV or more and 3.85 eV or less as calculated from a spectrum area of a Pt5d orbit-derived spectrum which is obtained by measuring a valence band spectrum in a range of 0 eV or more and 20 eV or less in the result of subjecting the catalyst particles to X-ray photoelectron spectroscopic analysis.

14 Claims, 3 Drawing Sheets

(51) Int. Cl.
*H01M 8/10* (2016.01)
*H01M 8/1018* (2016.01)
*B01J 23/42* (2006.01)
*B01J 35/00* (2006.01)
*B01J 21/18* (2006.01)
*B01J 23/40* (2006.01)

(52) U.S. Cl.
CPC .............. *H01M 8/10* (2013.01); *B01J 21/18* (2013.01); *B01J 23/40* (2013.01); *B01J 23/42* (2013.01); *B01J 35/006* (2013.01); *B01J 35/0033* (2013.01); *H01M 2008/1095* (2013.01)

(58) Field of Classification Search
CPC ............. C01P 2004/64; C01P 2002/80; C01P 2002/85; C01P 2006/90; C22C 5/04
USPC ................................. 502/101, 185; 420/466
See application file for complete search history.

(56) References Cited

U.S. PATENT DOCUMENTS

| | | | |
|---|---|---|---|
| 2003/0054227 A1* | 3/2003 | Hiroshima ............ | H01M 4/921 429/524 |
| 2009/0247400 A1 | 10/2009 | Stamenkovic et al. | |
| 2011/0077147 A1 | 3/2011 | Stamenkovic et al. | |
| 2011/0275011 A1* | 11/2011 | Zhu ....................... | H01M 4/921 429/524 |
| 2012/0202683 A1 | 8/2012 | Shirvanian | |
| 2015/0125783 A1 | 5/2015 | Ishida et al. | |
| 2015/0147682 A1 | 5/2015 | Kuttiyiel et al. | |
| 2015/0372314 A1* | 12/2015 | Ishida ................... | H01M 4/921 429/524 |
| 2018/0134559 A1 | 5/2018 | Kuttiyiel et al. | |

FOREIGN PATENT DOCUMENTS

| | | |
|---|---|---|
| JP | H09-47659 A | 2/1997 |
| JP | 3516734 B2 | 4/2004 |
| JP | 3683623 B1 | 8/2005 |
| JP | 5152942 B1 | 2/2013 |
| JP | 2013-105709 A | 5/2013 |
| JP | 5531125 B1 | 6/2014 |
| JP | 2014-209484 A | 11/2014 |
| WO | WO-2012/046138 A1 | 4/2012 |

OTHER PUBLICATIONS

Uchida et al., "Chapter 2 Constituent materials for polymer electrolyte fuel cells," ISBN 4-86043-034-4, Electron and Ion Functional Chemistry Series, vol. 4, All about Polymer Electrolyte Fuel Cells, First Edition, dated Oct. 1, 2003.

Stamenkovic et al., "Changing the Activity of Electrocatalysts for Oxygen Reduction by Tuning the Surface Electronic Structure," Angewandte Chemistry. vol. 45, No. 18, pp. 2897-2901.

International Searching Authority, "International Search Report," issued in connection with International Patent Application No. PCT/JP2018/015646, dated Jun. 12, 2018.

International Searching Authority, "Written Opinion," issued in connection with International Patent Application No. PCT/JP2018/015646, dated Jun. 12, 2018.

Extended European Search Report dated Mar. 31, 2020 for corresponding European Patent Application No. 18787449.0.

* cited by examiner

CATALYST FOR SOLID POLYMER FUEL CELLS AND METHOD FOR MANUFACTURING THE SAME

RELATED APPLICATIONS

The present application claims priority under 37 U.S.C. § 371 to International Patent Application No. PCT/JP2018/015646, filed on Apr. 16, 2018, which claims priority to and the benefit of Japanese Patent Application No. 2017-082639, filed on Apr. 19, 2017. The contents of these applications are hereby incorporated by reference in their entireties.

TECHNICAL FIELD

The present invention relates to a catalyst for forming electrodes for solid polymer fuel cells, and particularly to a catalyst excellent in activity as a catalyst for cathodes (air electrodes) for solid polymer fuel cells.

BACKGROUND ART

Practical realization of fuel cells, once termed as future power generation systems, have come to be realistic to meet expectations, and at present, popularization of fuel cells is desired. Fuel cells are classified into several types, and in particular, solid polymer fuel cells have the advantage of operating at a low temperature and having a small size. Due to such an advantage, solid polymer fuel cells are considered as promising automobile power sources and domestic power sources. A solid polymer fuel cell has a layered structure in which a solid polymer electrolyte membrane is sandwiched between a hydrogen electrode (anode) and an air electrode (cathode). Hydrogen as a fuel and air containing oxygen are supplied respectively to the hydrogen electrode and the air electrode, and power is generated by means of electrochemical oxidation and reduction reactions taking place at the electrodes. In addition, a mixture of a solid electrolyte and a catalyst for accelerating electrochemical reaction is generally applied for catalyst layers in both the electrodes.

As catalysts for forming the electrodes, platinum catalysts have been heretofore widely used. Platinum catalysts are catalysts obtained by supporting platinum as a catalyst metal on carbon powder as a carrier. Platinum as a catalyst metal has high activity in acceleration of electrode reaction at both a hydrogen electrode and an air electrode.

The applicant of the present invention has heretofore developed and disclosed many catalysts for solid polymer fuel cells and methods for manufacturing the catalysts. For example, methods for manufacturing a platinum catalyst have been disclosed in which platinum is supported on a carrier by a liquid phase reduction method with a predetermined platinum complex as a raw material (Patent Documents 1 and 2). These methods for manufacturing a catalyst are basic techniques for manufacturing platinum catalysts capable of exhibiting suitable activity, and provide fundamental techniques for platinum catalysts which are subsequently developed.

Further, in the field of catalysts for solid polymer fuel cells, catalysts having catalyst particles of alloys formed by platinum with other precious metals (Ru, Au and the like) or transition metals (Co, Mn and the like) have been developed for meeting the requirements of improving initial activity and durability, reducing the amount of platinum used, and so on. The applicant of the present invention has developed suitable platinum alloy catalysts (for example Patent Documents 3 and 4) on the basis of the above-described findings related to platinum catalysts.

RELATED ART DOCUMENT

Patent Documents

Patent Document 1: JP 3516734 B2
Patent Document 2: JP 3683623 B2
Patent Document 3: JP 5531125 B2
Patent Document 4: JP 5152942 B2

SUMMARY OF THE INVENTION

Problems to be Solved by the Invention

Results so far achieved regarding practical realization of solid polymer fuel cells are thanks to accumulation of many conventional arts. Continuous studies for improvement of catalyst properties will be required for popularization of solid polymer fuel cells.

Improvement of the properties of catalysts for fuel cells is directed to, for example, improvement of initial activity. The initial activity of a catalyst is a property which determines the performance of a fuel cell electrode, and thus it can be said that improvement of the initial activity is the highest priority. Also, improvement of durability as well as initial activity is required. The activity of a catalyst decreases due to an environmental change associated with operation of a fuel cell, and a catalyst having a decrease rate of the activity is not useful no matter how high the initial activity is. A decrease in activity of a catalyst is difficult to completely avoid, but should be suppressed as much as possible.

The present invention has been made against the above-mentioned backgrounds, and an object of the present invention is to provide a catalyst for solid polymer fuel cells in which catalyst particles containing platinum are supported on a carrier, the catalyst being capable of more preferred catalyst properties; and a method for manufacturing the catalyst.

Means for Solving the Problems

The reaction in a cathode of a fuel cell is an oxygen reduction reaction ($O_2+4H^++4e^-\rightarrow 2H_2O$). In this reaction, oxygen is adsorbed to a platinum surface at the beginning, protons and electrons are given and received at the platinum surface, and an oxygen species ($H_2O$) produced is desorbed from the platinum surface to complete the reaction. Therefore, the oxygen reduction activity of a catalyst depends on the level of a bonding strength between platinum and oxygen in catalyst particles.

Here, an index based on the d band center theory is known as an index for interpreting the oxygen reduction activity of metallic platinum. The d band center is an energy gravity center in terms of the Fermi level in an electron distribution (state density) in the 5d orbit of platinum. Oxygen reduction activity based on the d band center theory has been heretofore explained for filmy and bulk platinum. In the d band center theory, when the d band center shifts closer to the Fermi level, the bonding strength between platinum and oxygen increases, so that an oxygen species is hardly desorbed. On the other hand, when the d band center shifts far away from the Fermi level, the bonding property between platinum and oxygen is reduced, so that adsorption of oxygen itself hardly occurs. Thus, oxygen reduction activity is reduced when the d band center is excessively close to the Fermi level, and oxygen reduction activity is reduced when the d band center is excessively far away from the Fermi level.

However, according to the present inventors, evaluation of the properties of platinum based on the d band center theory has been so far performed solely on bulk or filmy platinum. The d band center has not been studied for examining the oxygen reduction activity of catalyst particles to be provided by the present invention, that is, particulate platinum or platinum alloy. Thus, the present inventors conducted studies on measurement of the state density of platinum in catalyst particles by X-ray photoelectron spectroscopic analysis (XPS), and the d band center.

In the process of the studies, the present inventors found that the state density of a Pt5d orbit-derived valence band in particulate platinum or platinum alloy had a characteristic distinction. The difference is a difference between the particulate platinum or platinum alloy and bulk platinum that has been known so far. Specifically, as shown in FIG. 1, the state density of the Pt5d orbit-derived valence band in particulate platinum is different in overall shape from that of bulk platinum. This difference includes a spectrum depression in the vicinity of the Fermi level (0 eV). In view of the results of the studies, the present inventors thought that evaluation of the oxygen reduction activity of particulate platinum or platinum alloy required setting unique criteria which had not been so far known. The present inventors examined such criteria, and extensively conducted studies on a configuration of catalyst particles exhibiting preferred oxygen reduction activity (catalytic activity), leading to the present invention.

That is, the present invention provides a catalyst for solid polymer fuel cells in which catalyst particles including platinum or platinum alloy are supported on a carbon powder carrier, and in the catalyst for solid polymer fuel cells, a bond energy (Ec) at a gravity center position is 2.90 eV or more and 3.85 eV or less as calculated from a spectrum area of a Pt5d orbit-derived spectrum which is obtained by subjecting the catalyst particles to X-ray photoelectron spectroscopic analysis to measure a valence band spectrum in a range of 0 eV or more and 20 eV or less.

Hereinafter, the present invention will be described in more detail. The catalyst for solid polymer fuel cells according to the present invention has a basic configuration similar to that in the conventional art, and has catalyst particles supported on a carrier including carbon powder.

As the catalyst particles, not only particles including platinum only but also particles including platinum alloy containing platinum and other precious metals and transition metals are used. Also, in the present invention, the meaning of alloy can be broadly interpreted, and not only catalyst particles including single-phase platinum alloy, but also complex catalyst particles having a multilayer structure (core/shell structure) are used. In any of the forms, it is necessary that platinum be present on the surfaces of particulate catalyst particles. The electron state of the platinum on the surfaces provides evaluation criteria in the present invention. When the catalyst particles are platinum alloy particles, examples of the metal added to platinum include Co, Mn, Mg, Ni, Cu, Zr, Ru and Au. Further, examples of catalyst particles having a multilayer structure include those having particles including at least one of Pd, Ru, Au, Ag, Ni, Co, Cu, Sn, Ti and Zr as a core, and a shell including platinum or platinum alloy. In the present invention, it suffices that catalyst particles including platinum or platinum alloy are present on a carrier, and metal particles which do not contain platinum may be supported on other portions of the carrier.

In the present invention, an electron distribution (state density) of catalyst particles is regulated on the basis of the analytical results of X-ray photoelectron spectroscopic analysis of catalyst particles as described above. The purpose of setting such a regulation is to obtain appropriate oxygen reduction activity in a cathode by adjusting the bonding property between platinum and oxygen as described above. For the regulation of the state density of catalyst particles, a bond energy (Ec) at a gravity center position (d band center) is 2.95 eV or more and 3.78 eV or less as calculated from a spectrum area of a Pt5d orbit-derived spectrum in measurement of a valence band spectrum in a range of 0 eV or more and 20 eV or less.

In the present invention, the method for determining a bond energy (Ec) indicating a d band center of platinum in catalyst particles is as follows. That is, a valence band spectrum is measured to calculate an energy position at which the spectrum area is divided into two equal parts at a peak in the Pt5d orbit-derived spectrum. The energy position corresponds to the target bond energy (Ec). In this calculation process, excluding influences of a background and the like is preferable.

In the catalyst according to the present invention, the bond energy (Ec) corresponding to the d band center of platinum in catalyst particles, which is calculated in the manner described above, is in a range of 2.90 eV or more and 3.85 eV or less. When the bond energy (Ec) is outside the range, the oxygen reduction reaction cannot be allowed to favorably proceed, and thus to secure catalytic activity becomes difficult.

The present invention discloses the regulation for the d band center of particulate platinum, and an optional configuration which enables catalyst properties to be improved. That is, in the catalyst according to the present invention, the ratio of zerovalent platinum to all the platinum present on the surfaces of the catalyst particles is preferably 75% or more. In a platinum catalyst or a platinum alloy catalyst manufactured by a chemical reduction method, divalent platinum ions or tetravalent platinum ions may be present in addition to zerovalent platinum atoms on the surfaces of catalyst particles. Studies by the present inventors show that a catalyst in which a large number of such ionized platinum atoms are present on the surface has low activity. The reason for this is that divalent or tetravalent platinum ions are derived from platinum oxides, and thus cannot adsorb oxygen. Thus, it is preferable to secure oxygen reduction activity by reducing the ratio of divalent or tetravalent platinum ions to ensure that the ratio of zerovalent platinum atoms is above a certain level. The upper limit of the ratio of zerovalent platinum is preferably 100%.

The ratio of zerovalent platinum atoms is measured and calculated in the following manner. A Pt4f spectrum is measured by X-ray photoelectron spectroscopic analysis, and the obtained spectrum is subjected to waveform separation treatment for clarifying peaks derived from the states of zerovalent platinum, divalent platinum and tetravalent platinum. The ratio of zerovalent platinum can be determined from the ratios of peak areas for the states.

Preferably, the above-described catalyst particles including platinum or platinum alloy have an average particle size of 2 nm or more and 500 nm or less. When the average particle size is less than 2 nm, long-time activity sustainability cannot be reliably obtained, and when the average particle size is more than 500 nm, the catalyst cannot exhibit sufficient initial activity. The average particle size of the catalyst particles is more preferably 50 nm or less, still more preferably 5 nm or less. The average particle size of catalyst particles is a particle size of only active metal (platinum or alloy) particles, which is a size of connected crystals (also referred to as a crystallite diameter), and does not include the particle size of a carrier. The catalyst particle size can be calculated from an XRD peak half width in accordance with the following Scherrer equation.

$$R = 0.9\lambda/(W \cos\theta) \quad \text{[Formula 1]}$$

(R: particle size (crystallite diameter)/nm, A: wavelength of X-ray used (for example, 0.154 nm in Cu Kα ray), W: peak half width/degree, θ: incidence light/degree)

Further, as carbon powder which is a carrier supporting catalyst particles, it is preferable to apply the carbon powder having a specific surface area of 50 $m^2$/g or more and 1500 $m^2$/g or less. When the specific surface area is 50 $m^2$/g or more, the area over which the catalyst deposited can be increased, so that catalyst particles can be dispersed at a high level to increase the effective surface area, and when the specific surface area is more than 1500 $m^2$/g, the abundance ratio of ultrafine pores (having a pore size of less than about 20 Å) which an ion-exchange resin hardly enter in formation of an electrode increases, so that the utilization efficiency of the catalyst particles is reduced.

The carrying rate of catalyst particles in the catalyst according to the present invention is preferably 20% or more and 70% or less in consideration of the performance of an electrode for a solid polymer fuel cell. The carrying rate is more preferably 46 to 60%, still more preferably 48 to 52%. The carrying rate here is a ratio of the mass of catalyst particles supported on a carrier (the total mass of supported platinum and alloy elements) to the mass of the entire catalyst.

A method for manufacturing a catalyst for solid polymer fuel cells according to the present invention will now be described. In manufacturing of the catalyst according to the present invention, it is possible to essentially follow a chemical reduction method which is the conventional art (Patent Documents 1 and 2). For the platinum catalyst in which platinum is supported as a catalyst metal, a platinum compound solution is mixed with a carrier, a reducing agent is added to the resulting mixed solution, and the mixture is refluxed to precipitate platinum particles as a catalyst metal. In this way, the platinum catalyst can be manufactured.

The platinum compound solution is preferably a dinitrodiammine platinum nitric acid solution, a chloroplatinate aqueous solution, a potassium chloroplatinate aqueous solution or a hexaammine platinum hydroxide solution. Such a platinum complex is stable in an aqueous solution, so that reduced platinum fine particles are not aggregated to increase the particle size, and the platinum complex can be uniformly supported. In particular, a dinitrodiammine platinum nitric acid solution is preferable.

In the method for manufacturing a catalyst according to the present invention, carbon powder as a carrier is mixed with the platinum compound solution to prepare a mixed solution, and it is preferable that in this step, the platinum compound solution and the carbon powder are mixed while being ground. The step of preparing the mixed solution is for supporting platinum ions of the platinum compound solution on a carrier, and dictates platinum ion dispersibility and a supporting state. The present inventors point out that by grinding the carrier in the mixing step, the dispersion state of platinum ions can be optimized.

In the mixing step, the concentration of the platinum complex in the platinum compound solution is not particularly limited. A platinum compound solution having any concentration can be used while consideration is given to the amount of platinum to be supported. In the mixing step including the grinding treatment, the grinding treatment is preferably performed while adjusting the ratio of the amount of the platinum compound solution containing water to the amount of the carbon powder. Specifically, the grinding treatment is preferably performed while ensuring that the ratio of the weight of the carbon powder to the weight of the platinum compound solution is 1:75 to 1:1000. When the amount of the platinum compound solution is less than 75 g based on 1 g of the carbon powder, the viscosity of the mixed solution will increase, resulting in occurrence of irregular reaction in subsequent reduction treatment. On the other hand, when the platinum compound solution is used in an amount of more than 1000 g based on 1 g of the carbon powder, it is necessary to reduce the concentration of platinum in the platinum compound solution, so that subsequent reduction reaction hardly proceeds. The grinding treatment is preferably performed while the concentration of platinum in the platinum compound solution is set to 0.05% by mass or more and 5% by mass or less, and the ratio of the weight of the carbon powder to the weight of the platinum compound solution is set within the above-described range.

The grinding device in the grinding treatment is not particularly limited, and a colloid mill, a planetary ball mill or the like can be applied. The time during which the mixed solution is subjected to grinding is preferably 30 minutes or more and 6 hours or less.

A reducing agent is added to a mixed solution of a carrier and the platinum compound solution prepared as described above. The reducing agent is preferably an alcohol (methanol, ethanol or the like). A so-called modified alcohol obtained by mixing a small amount of methanol with ethanol can also be used. Preferably, the reducing agent is added in an amount of 4 mol or more and 280 mol or less based on 1 mol of platinum in the mixed solution, and at a concentration of 1% by volume or more and 60% by volume or less to the mixed solution.

As reflux (reduction) conditions after addition of the reducing agent, it is preferable that the temperature of the mixed solution is not lower than 60° C. and not higher than the boiling temperature, and the reduction time is 3 hours or more and 6 hours or less. Platinum particles are supported on the carrier by the reduction treatment. Thereafter, the catalyst is recovered and appropriately subjected to a drying treatment to obtain a platinum catalyst.

The manufactured platinum catalyst may be subjected to heat treatment. The heat treatment can be performed in a reducing atmosphere (hydrogen or the like) at 800° C. or higher and 1500° C. or lower.

In the manner described above, a platinum catalyst can be manufactured in which platinum is supported as a catalyst metal. For manufacturing a catalyst having platinum alloy as a catalyst metal, alloy forming additive metals (cobalt, manganese, magnesium and the like) are supported on a platinum catalyst manufactured in the manner described above, and each metal is formed into alloy to obtain a platinum alloy catalyst. For alloy formation treatment in manufacturing of the platinum alloy catalyst, it is preferable that a catalyst in which each metal is supported is subjected to heat treatment at 800 to 1500° C. The heat treatment is performed preferably in a non-oxidizing atmosphere, particularly preferably in a reducing atmosphere (hydrogen gas atmosphere or the like).

Further, regarding a catalyst having a multilayer structure such as a so-called core/shell structure, a metal other than platinum, such as Pd, is first supported as a core on a carrier, followed by supporting platinum on the surface of the core. The method for supporting the metal as a core on the carrier is the same as in the above-described method for manufacturing a catalyst. At the time of supporting the core, it is preferable that the carrier and the metal compound solution for forming the core are mixed with each other in a grinder. Thereafter, platinum is sufficient to be supported on the surface of the core by a known method such as a Cu-UPD method.

Advantageous Effects of the Invention

As described above, the solid polymer fuel cell catalyst according to the present invention regulates the electron state (d band center and ratio of zerovalent platinum) of platinum on the surfaces of catalyst particles, and this shows that the catalyst is excellent in activity.

DESCRIPTION OF EMBODIMENTS

First Embodiment

Hereinafter, a preferred embodiment of the present invention will be described. In this embodiment, a platinum catalyst was manufactured in which only platinum was supported, and properties of the platinum catalyst were evaluated.

Example 1

A platinum catalyst was manufactured in the following manner. First, in a colloid mill, a dinitrodiammine platinum nitric acid solution (platinum content: 30.8 g) was diluted with pure water to prepare 4685 mL of an aqueous solution.

30.8 g of carbon fine powder (specific surface area: 800 $m^2/g$, trade name: OSAB) as a carrier was added to the dinitrodiammine platinum nitric acid aqueous solution while being ground. Grinding treatment was performed for 1 hour, a denatured alcohol (95% of ethanol+5% of methanol) as a reducing agent was then added in an amount of 318 mL (6.4% by volume, 34.5 mol based on 1 mol of platinum), and mixed. The mixed solution was refluxed and reacted at about 95° C. for 6 hours to reduce the platinum. Thereafter, filtration, drying and washing were performed. By the above steps, a platinum catalyst was obtained in which platinum particles were supported. The carrying rate in the catalyst was 48%, and the average particle size of the catalyst particles was 2.5 nm.

Comparative Example

A platinum catalyst similar to that in Example 1 was manufactured. A carbon fine powder carrier was introduced into a dinitrodiammine platinum nitric acid solution identical to that in Example 1, and rather than grinding treatment, stirring was performed to prepare a slurry. The slurry was brought into a neutral condition, so that platinum was precipitated to manufacture a platinum catalyst. The carrying rate in the catalyst was 45%, and the average particle size of the catalyst particles was less than 2.0 nm.

The platinum catalysts manufactured in Example 1 and Comparative Example were subjected to XPS analysis, and the d band center values and the states of platinum on the surface (ratios of zerovalent platinum) were evaluated. For the XPS analysis, Quantera SXM manufactured by ULVAC-PHI, Inc. was used as an analyzer. For analysis, a platinum catalyst was fixed on a vacuum double-sided carbon tape as preparation of a sample. Here, a sufficient amount of the platinum catalyst was placed so as not to expose a backing tape portion, and the platinum catalyst was pressed from above a powder paper to form a flat surface. Thereafter, an excess sample was removed by a blower. As pretreatment of the sample, sputter etching was performed by use of an XPS-attached ion gun for evaluating a state in which surface contaminants of the platinum catalyst were removed. As a sputter condition, Ar ions were applied to the catalyst at an accelerating voltage of 1 kV (1 min).

Figure 1:
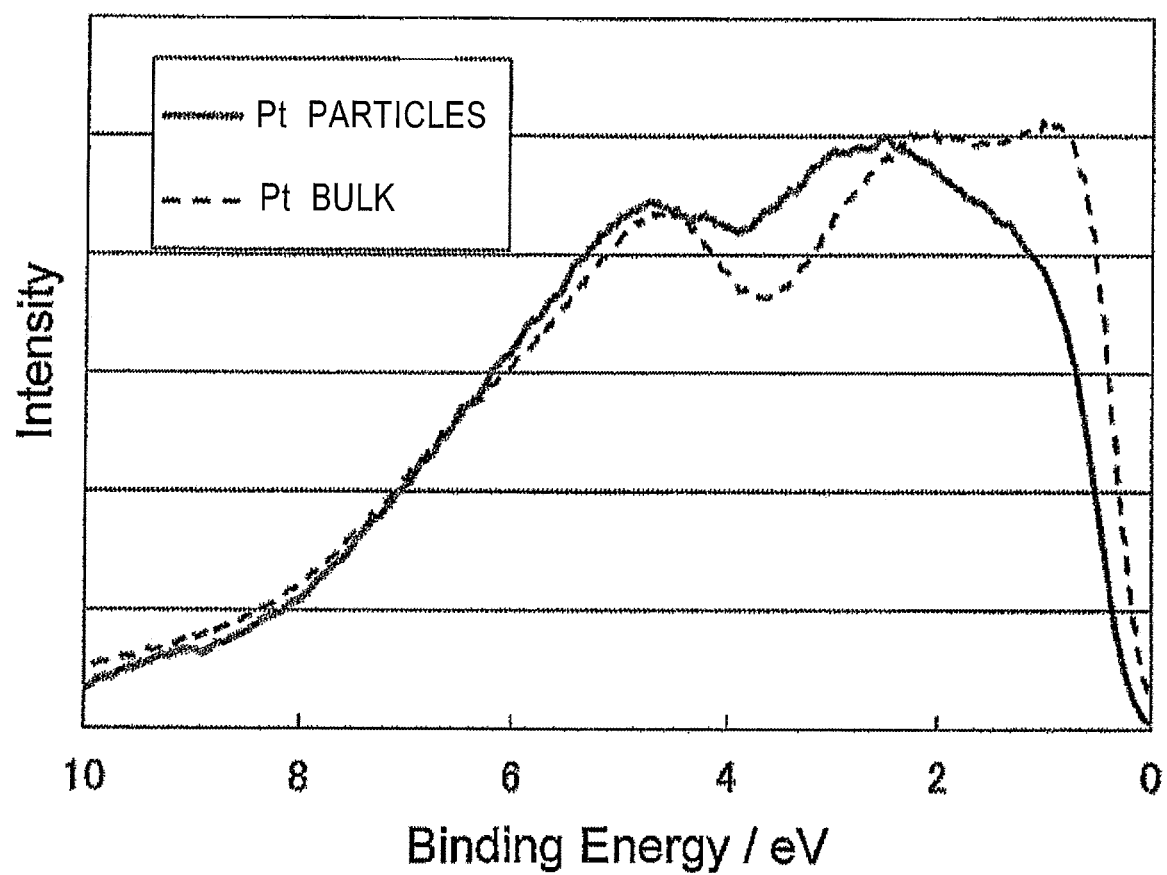
FIG. 1 is a diagram for comparative illustration of bulk platinum and particulate platinum with regard to a Pt5d orbit-derived valence band spectrum in XPS.
Figure 2:
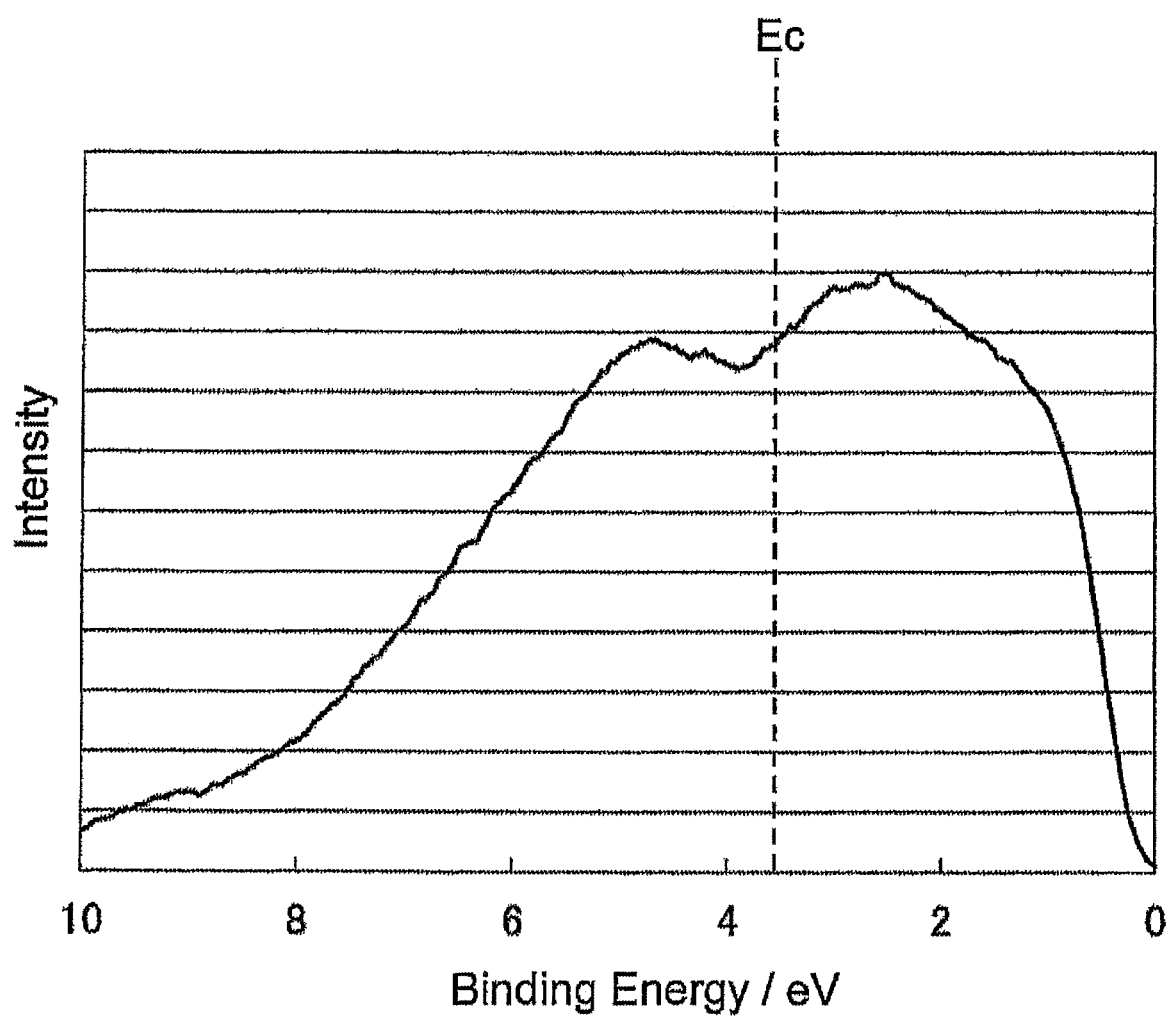
FIG. 2 is a diagram showing the result of XPS analysis (narrow-area photoelectron spectrum: Pt5d spectrum) in Example 1.

As XPS analysis conditions, a monochromatized Al-Kα ray was used as an applied X-ray, the voltage was 15 kV, the power was 25 W, and the X-ray beam diameter was 200 μmφ. Generated photoelectric energy was detected to acquire a wide-area photoelectron spectrum (wide spectrum) and a narrow-area photoelectron spectrum (narrow spectrum). FIG. 2 shows an XPS spectrum of the platinum catalyst of Example 1.

The data of the obtained spectrum was analyzed by use of software (MultiPak V8.2C) manufactured by ULVAC-PHI, Inc. The analysis of the d band center was performed by use of the Pt5d spectrum in XPS. In the analysis, first, the measured Pt5d spectrum was corrected by software so that a C—C-derived peak appeared at 284.8 eV in the C1s spectrum. A background was subtracted by the Iterated Shirley method, and the bond energy value at which the spectrum area after correction was divided in half was defined as a d band center value (Ec).

Further, the result of measuring the Pt4f spectrum in XPS was used to determine the ratio of zerovalent platinum to platinum on the surfaces of the catalyst particles. In this analysis, "Pt" was associated with three chemical states (zerovalent Pt (0), divalent Pt (II) and tetravalent Pt (IV)). The main peak positions for the states were set at 71.7 eV for zerovalent Pt (0), 72.7 eV for divalent Pt (II) and 74.4 eV for tetravalent Pt (IV), and separation of peaks in the Pt4f spectrum measured by the software was performed. After the separation of peaks was performed, the ratio of each Pt was calculated from the area ratio of the peak for each state.

From the XPS spectrum measured for the platinum catalysts of Example 1 and Comparative Example, the d band center values of the platinum catalysts were calculated, and the results showed that the d band center values in Example 1 and Comparative Example were 3.78 eV and 3.99 eV, respectively. Further, the ratios of zerovalent platinum (Pt (0)) in Example 1 and Comparative Example were 79% and 47%, respectively. In the platinum catalyst of this embodiment, the d band center position shifts to the negative side as compared to Comparative Example. Further, it was found that a ratio of zerovalent platinum was higher.

Next, catalytic activity (initial activity) was evaluated for the platinum catalysts of Example 1 and Comparative Example. In this evaluation test, the area specific activity was calculated from the measured values of the electrochemical surface area and the activity controlling current of each catalyst was calculated, and evaluated as a relative value against the area specific activity in Comparative Example. The electrochemical surface area was measured in the following manner. The amount of electricity in adsorption and desorption of flowing protons at a potential cycle between 0.05 V and 1.2 V (sweeping rate: 100 mV/s) in an electrolytic solution (0.1 M perchloric acid) in which a rotating disc electrode coated with 8 µg of a catalyst was saturated with nitrogen. From the measured amount of electricity in adsorption and desorption of protons, the electrochemical surface area was calculated by use of a constant (0.21 mC/cm$^2$).

The method for measuring the activity controlling current includes rotating the rotating disc electrode to examine oxygen reduction activity. Specifically, in an electrolytic solution (0.1 M perchloric acid) saturated with oxygen, the electrode was steadily rotated (400 rpm, 900 rpm, 1600 rpm, 2500 rpm, 3600 rpm), and the oxygen reduction current was measured at a sweeping rate of 20 mV/s with the voltage changed from 0.5 V to 1.0 V. After the measurement, the current value at 0.9 V at each rotation speed was approximated by the Koutecky-Levich equation to obtain an activity controlling current. The area specific activity was calculated by use of the electrochemical surface area obtained as described above. In this embodiment, the area specific activity of the catalyst of Example 1 was determined as a relative value against the area specific activity in Comparative Example which was defined as "1". The result of the evaluation is shown in Table 1 together with the above-described physical property values.

TABLE 1

| | d band center | Pt ratio | | |
|---|---|---|---|---|
| | (Ec) | Pt (0) | Pt (II) + Pt (IV) | Initial activity |
| Example 1 | 3.78 eV | 79% | 21% | 1.75 |
| Comparative Example | 3.99 eV | 47% | 53% | 1 |

Table 1 reveals that the platinum catalyst in which the d band center value in Example 1 had higher initial activity.

Second Embodiment

Here, a plurality of platinum catalysts and platinum alloy catalysts were manufactured, and in the same manner as in the first embodiment, the d band center value (Ec) and the ratio of zerovalent platinum (Pt(0)) were evaluated, and an activity test was conducted.

Example 2

The platinum catalyst manufactured in Example 1 was further subjected to heat treatment to manufacture a catalyst. The heat treatment was performed by heating the platinum catalyst in a hydrogen reducing atmosphere at 900° C. for 1 hour. The carrying rate in the catalyst was 51%, and the average particle size of the catalyst particles was 4.7 nm.

Example 3

In this example, two stages of platinum supporting steps were carried out to manufacture a platinum catalyst. In the first-stage platinum supporting step, a platinic chloride solution (platinum content: 30.8 g) was diluted with pure water to prepare 4685 mL of an aqueous solution. 13.2 g of a carbon fine powder carrier identical to that in Example 1 was added while being ground. Grinding treatment was performed for 1 hour, and the pH was then adjusted with sodium hydroxide, and a reduction reaction was carried out at about 70° C. for 2 hours. Methanol as a reducing agent was added to and mixed with the reaction solution. The mixed solution was subjected to a reduction reaction at about 70° C. for 2 hours to reduce the platinum. Thereafter, filtration, drying and washing were performed.

Subsequently, in the second-stage platinum supporting step, a carrier having platinum supported in the first stage was added to a dinitrodiammine platinum nitric acid aqueous solution (4685 mL, platinum content: 30.8 g) to that in Example 1. By adding methanol as a reducing agent, a reduction reaction was carried out at 70° C. for 1 hour to reduce the platinum. A platinum catalyst was manufactured through the above first-stage and second-stage platinum supporting steps. The carrying rate in the catalyst was 48%, and the average particle size of the catalyst particles was 2.1 nm.

Example 4

In this example, a catalyst having platinum-cobalt alloy particles supported as catalyst particles was manufactured. 10 g of the platinum catalyst manufactured in Example 1 was immersed in 60 g of a cobalt chloride aqueous solution (cobalt content: 0.4 g) having a cobalt concentration of 0.66 wt % as a cobalt solution. The solution was stirred for 1 hour, dried at 60° C., and then heated in a hydrogen reducing atmosphere at 900° C. for 1 hour. The carrying rate in the catalyst was 52%, and the average particle size of the catalyst particles was 3.5 nm.

Example 5

In this example, a catalyst including catalyst particles having a so-called core/shell structure in which platinum was precipitated on the surfaces of palladium particles. First, 35 g of carbon powder (trade name: Ketjen Black EC, specific surface area: 800 g/m$^3$) as a carrier was immersed in a palladium chloride solution (Pd content: 15 g (0.028 mol)) in a colloid mill, and then made neutral with sodium carbonate. This carbon powder was reduced with sodium formate to prepare carbon powder in which palladium particles as core particles were supported. The carrying rate in the catalyst was 50%, and the average particle size of the catalyst particles was 4.5 nm.

Figure 3:
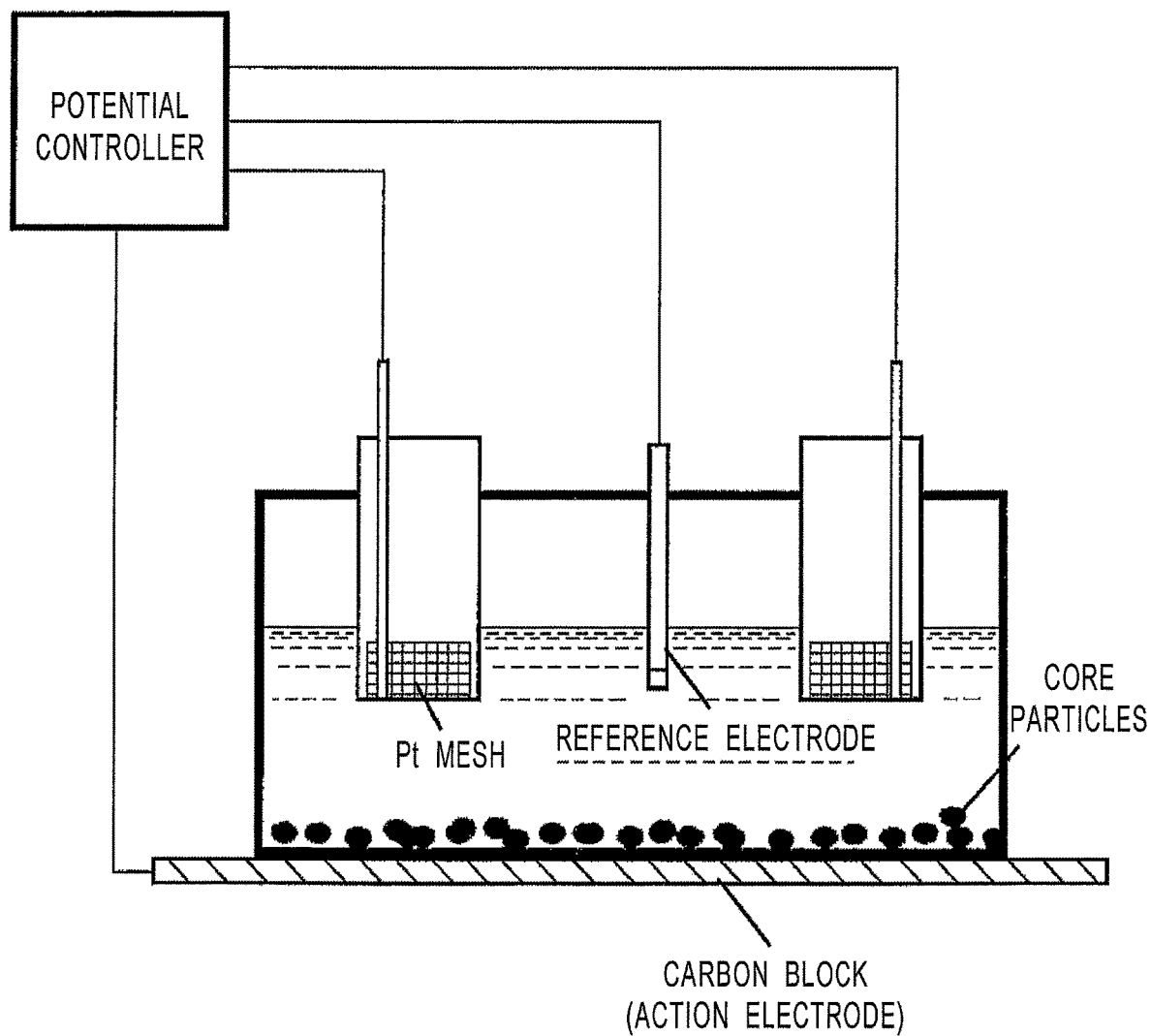
FIG. 3 is a diagram illustrating a configuration of an electrolytic apparatus used in manufacturing of a catalyst of Example 5.

Next, platinum was supported by a Cu-UPD method. In this method, first the surfaces of the palladium particles were covered with a copper layer by use of an electrolyzer. The electrolyzer used in this embodiment is shown in FIG. 3. In the electrolyzer in FIG. 3, a counter electrode tube having a platinum mesh as a counter electrode, and a reference electrode are inserted in an electrolytic bath containing an electrolytic solution. The bottom portion of the electrolytic bath is composed of carbon black, and the carbon black acts as an action electrode. The counter electrode, the reference electrode and the action electrode are connected to a potential controller.

In the electrolytic treatment of the palladium particles, first, 6 L of a sulfuric acid solution (0.05 M) was added into an electrolytic bath, and 50 g (0.32 mol) of copper sulfate was dissolved in this solution to perform pretreatment for reducing the amount of dissolved oxygen. In this pretreatment, first, nitrogen was injected into a glove box to turn the oxygen concentration to about 0 ppm, and with the electrolyzer placed in the glove box, injection of nitrogen into the glove box and bubbling of the electrolytic solution with nitrogen were performed for 12 hours. The amount of dissolved oxygen was confirmed to be 1 ppm or less before the electrolytic treatment. 10 g of carbon powder with palladium particles supported in the manner described above was put to the bottom portion of the electrolytic bath, and potential control was performed by the potential controller to electrolytically precipitate copper. Electrolysis conditions here are as follows. During the electrolytic treatment, injection of nitrogen into the glove box and bubbling of the electrolytic solution with nitrogen were continued.

[Electrolysis Conditions]
Potential: fixation of potential at 0.39 V (vs. RHE)
Potential fixation time: 3 hours In the electrolytic bath, 3.4 g (0.0083 mol) of potassium platinichloride was dissolved as a platinum compound solution after the electrolytic treatment. Further, at the same time, 48 g of citric acid was added. This causes a displacement reaction between copper on the surfaces of palladium core particles and platinum. The reaction time of the displacement reaction step was 1 hour. After formation of a platinum shell layer, the carbon powder was recovered by filtration, washed with pure water, and dried at 60° C. to obtain a catalyst.

The catalyst of each of Examples 2 to 5 manufactured in this embodiment was subjected to XPS analysis to determine the d band center value (Ec) and the ratio of zerovalent platinum (Pt(0)). Further, an activation test was conducted. The evaluation and test conditions were the same as in the first embodiment. The results thereof are shown in Table 2.

TABLE 2

| | d band center | Pt ratio | | |
| --- | --- | --- | --- | --- |
| | (Ec) | Pt (0) | Pt (II) + PT (IV) | Initial activity |
| Example 1 | 3.78 eV | 79% | 21% | 1.75 |
| Example 2 | 3.53 eV | 100% | 0% | 2.24 |
| Example 3 | 3.65 eV | 95% | 5% | 2.51 |
| Example 4 | 3.51 eV | 100% | 0% | 4.45 |
| Example 5 | 2.95 eV | 100% | 0% | 3.94 |
| Comparative Example | 3.99 eV | 47% | 53% | 1 |

The catalysts of examples were shown to have a d band center value (Ec) of 3.85 eV or less and exhibit favorable initial activity. Comparison between Example 1 and Example 2 shows that the ratio of zerovalent platinum (Pt(0)) increases. This may be because oxide-derived divalent or tetravalent platinum was reduced by high-temperature treatment after platinum was supported. It was confirmed that an increase in the amount of zerovalent platinum enhanced activity.

INDUSTRIAL APPLICABILITY

The catalyst for solid polymer fuel cells according to the present invention is excellent in an initial activity because the electron state of platinum in catalyst particles is optimized. Solid polymer fuel cells are expected as future power generation systems for automobile power sources and domestic power sources, and commercialization of fuel cell mounting vehicles has been started. The present invention is an invention which contributes to promotion of practical realization of the fuel cells.

The invention claimed is:

1. A catalyst for solid polymer fuel cells in which catalyst particles consisting of platinum or a single phase platinum alloy are supported on a carbon powder carrier, wherein
a bond energy (Ec) at a gravity center position is 2.90 eV or more and 3.85 eV or less as calculated from a spectrum area of a Pt5d orbit-derived spectrum which is obtained by subjecting the catalyst particles to X-ray photoelectron spectroscopic analysis to measure a valence band spectrum in a range of 0 eV or more and 20 eV or less wherein the X-ray photoelectron spectroscopic analysis uses a monochromatized Al-KαX-ray source.

2. The catalyst for solid polymer fuel cells according to claim 1, wherein the bond energy (Ec) at the gravity center position is 2.95 eV or more and 3.78 eV or less.

3. The catalyst for solid polymer fuel cells according to claim 1, wherein the bond energy (Ec) at the gravity center position is 2.95 eV or more and 3.65 eV or less.

4. The catalyst for solid polymer fuel cells according to claim 1, wherein the bond energy (Ec) at the gravity center position is 2.95 eV or more and 3.53 eV or less.

5. The catalyst for solid polymer fuel cells according to claim 1, wherein a ratio of zerovalent platinum to platinum present on surfaces of the catalyst particles is 95% or more and 100% or less.

6. The catalyst for solid polymer fuel cells according to claim 1, wherein a ratio of zerovalent platinum to platinum present on surfaces of the catalyst particles is 100%.

7. The catalyst for solid polymer fuel cells according to claim 1, wherein a ratio of zerovalent platinum to platinum present on surfaces of the catalyst particles is 75% or more and 100% or less.

8. The catalyst for solid polymer fuel cells according to claim 7, wherein the catalyst particles have a particle size of 2 nm or more and 500 nm or less.

9. The catalyst for solid polymer fuel cells according to claim 7, wherein a carrying rate of the catalyst particles is 20% or more and 70% or less.

10. The catalyst for solid polymer fuel cells according to claim 1, wherein the catalyst particles have a particle size of 2 nm or more and 500 nm or less.

11. The catalyst for solid polymer fuel cells according to claim 10, wherein a carrying rate of the catalyst particles is 20% or more and 70% or less.

12. The catalyst for solid polymer fuel cells according to claim 1, wherein a carrying rate of the catalyst particles is 20% or more and 70% or less.

13. The catalyst for solid polymer fuel cells according to claim 1, in which the catalyst particles consist of platinum.

14. The catalyst for solid polymer fuel cells according to claim 1, in which the catalyst particles consist of the single phase platinum alloy.

* * * * *